United States Patent [19]

Hasegawa

[11] Patent Number: 5,631,304

[45] Date of Patent: May 20, 1997

[54] METHOD OF MANUFACTURING RIGID FOAMED PRODUCT

[76] Inventor: Itsuro Hasegawa, 4-3-9, Obata, Moriyama-ku, Nagoya-shi, Aichi-ken, Japan

[21] Appl. No.: 548,611

[22] Filed: Oct. 26, 1995

[30] Foreign Application Priority Data

Oct. 27, 1994 [JP] Japan .................................. 6-263912

[51] Int. Cl.$^6$ ........................................................ C08J 9/08
[52] U.S. Cl. ............................ 521/94; 521/96; 521/142; 521/144; 521/155; 264/46.6; 264/46.7; 264/51; 264/54; 264/299
[58] Field of Search ................................. 521/149, 142, 521/155, 94, 96; 264/46.6, 46.7, 51, 54, 299

[56] References Cited

U.S. PATENT DOCUMENTS

| | | | |
|---|---|---|---|
| 4,607,060 | 8/1986 | Kniec et al. | 521/89 |
| 4,755,402 | 7/1988 | Obesle | 264/210.7 |
| 5,077,317 | 12/1991 | Yi-Shyu | 521/82 |

*Primary Examiner*—Samuel A. Acquah
*Assistant Examiner*—John M. Cooney, Jr.
*Attorney, Agent, or Firm*—Dennison, Meserole, Pollack & Scheiner

[57] ABSTRACT

A method of manufacturing a rigid foamed product includes the steps of mixing a metal adhesive resin, a foaming agent, a foaming accelerator, a crosslinking agent, a monomer, and a fibrous material to formulate a foamable composition, arranging the foamable composition thus formulated in a cavity of a formed metal component, and heating the metal component with the foamable composition.

4 Claims, No Drawings

METHOD OF MANUFACTURING RIGID FOAMED PRODUCT

BACKGROUND OF THE INVENTION

The present invention relates to a method of manufacturing a rigid foamed product, and more particularly to a method of manufacturing a rigid foamed product suitable for filling up a hollow portion of a formed steel article and the like for reinforcement.

In general, conventional rigid foamed products are produced by adding fibrous materials to resins to form resin complexes and subsequently foaming the resin complexes, or by adding porous fillers to resins to form porous resin products.

The conventional methods utilizing the fibrous materials described above may produce rigid formed products which satisfy rigidity requirements. However, most of such methods cannot produce sufficiently lightweight formed products since each product has merely a limited resin expansion ratio of up to about 2 because of release of gases generated through the fibrous materials. If the resins used are replaced with highly foamable resinous materials which may exhibit a high expansion ratio greater than 2, these methods cannot also produce fiber reinforced foamed products having a high expansion ratio of greater than 2 since the gases generated are released through the fibrous materials. Further, in the methods utilizing the porous fillers, it is difficult to mount the products in hollow portions (hereinafter also referred to as cavities) formed within a formed metal article.

SUMMARY OF THE INVENTION

It is an object of the invention to provide a method of manufacturing a rigid foamed product in which the problems associated with the conventional methods are eliminated.

It is another object of the invention to provide a method of manufacturing a rigid foamed product which is sufficiently lightweight.

It is a further object of the invention to provide a method of manufacturing a foamed product which can be easily mounted in the cavity and which has an increased resin expansion ratio.

It is a still further object of the invention to provide a method of manufacturing a foamed product which has an excellent filling power to the cavity and which exhibits a good adhesion to a cavity surface.

As described above, although the inventor of the present invention has been aware that the methods utilizing the fibrous materials cannot usually produce highly expanded formed products since gases generated are released through the fibrous materials, he has positively continued an investigation for obtaining sufficiently rigid and lightweight foamed products. The investigation has shown that if some specific resinous materials are used, such methods may produce fiber reinforced rigid foamed products having a high expansion ratio of greater than 2.

The present invention provides a method of manufacturing a rigid foamed product, comprising the steps of mixing a metal adhesive resin, a foaming agent, a foaming accelerator, a crosslinking agent, a monomer, and a fibrous material to formulate a foamable composition, arranging the foamable composition thus formulated in a cavity of a formed metal component, and heating the metal component with the foamable composition.

According to this invention, the metal adhesive resin is adhered to a metal surface in the cavity when the foamable composition is foamed by heat treating. The fibrous material may rigidify the foamable composition without preventing the expandability of the foamable composition, thereby to permit formation of a lightweight rigid foamed product which has increased rigidity.

Further, in this invention, the foamable composition is formulated by mixing the ingredients as described and subsequently is arranged in the cavity. Therefore, the foamable composition can be easily handled and speedily arranged in the cavity. The foamable composition can be expanded at an expansion ratio of about 2 to 5, thereby forming a lightweight rigid foamed product having an excellent filling power to the cavity and a good adhesion to the cavity surface.

Preferably, the step of mixing the ingredients is conducted at a low temperature sufficient to avoid activation of the foaming agent. This may lead to formation of a foamable composition of which the ingredients are not reacted with each other.

The metal adhesive resin may be an ethylene-methyl acrylate copolymer resin, an ethylene-ethyl acrylate copolymer resin, or an ethylene-butyl acrylate copolymer. This may lead to formation of a rigid foamed product having a good adhesion to the metal surface of the cavity.

The metal adhesive resin may be a mixture of not less than 50% of the ethylene-methyl acrylate copolymer resin, the ethylene-ethyl acrylate copolymer resin, or the ethylene-butyl acrylate copolymer and not more than 50% of a low density polyethylene. Such a mixture may form a rigid foamed product adhered to the metal surface of the cavity. The rigidity and adhesion of the foamed product decrease as the content of the low density polyethylene increases.

The fibrous material may be a fiberglass having a length of 5 to 20 mm and having a content of 10 to 100 parts by weight per 100 parts by weight of the metal adhesive resin. The fiberglass may form a good rigid foamed product.

The method may include the step of forming the foamable composition into a profiled block having a desired configuration corresponding to the configuration of the cavity. The foamable composition thus formed can be easily handled and speedily arranged in the cavity.

The rigid foamed product obtained by the method of the present invention is a lightweight one having excellent rigidity. Therefore, such a product is suitable for reinforcing a hollow portion of a formed metal component.

The present invention will become more fully apparent from the following description.

DETAILED DESCRIPTION OF THE PREFERRED EMBODIMENTS

In the method of manufacturing a rigid foamed product, first, a foamable composition is formulated. The foamable composition is formulated by mixing a metal adhesive resin, a foaming agent, a foaming accelerator, a crosslinking agent, a monomer, and a fibrous material. The composition thus formulated is subsequently arranged in a hollow portion or cavity of a formed metal component and is heat treated together with the formed metal component.

The metal adhesive resin is a polar resin which may adhere to a metal surface when it is heat treated for foaming. The metal adhesive resin may typically be a polymer of ethylene with an acrylic ester of an $C_1$–$C_5$ alcohol. Examples of such a resin include an ethylenemethyl acrylate copolymer resin (hereinafter referred to as EMA), an ethylene-ethyl acrylate copolymer resin (hereinafter referred to as EEA), an ethylene-butyl acrylate copolymer (hereinafter referred to as EBA). It is to be noted that the metal adhesive resin may be a mixture of EMA, EEA or EBA and a low density polyethylene (LDPE). The mixture may have a LDPE content of not more than 50% so as not to lose adhesion.

The foaming agent may be one or two of members selected from the group consisting of azodicarbonamido (ADCA), dinitrosopentamethylenetetramine, oxy-bis (benzenesulfonyl hydorazide), and similar compounds.

The foaming accelerator may be zinc stearate, ZnO, MgO, stearic acid, and similar compounds.

Examples of the crosslinking agent include dicumyl peroxide (DCP), 1,3-bis(t-butylperoxyisopropyl) benzene, and a mixture thereof.

The monomer may be triallyl isocyanurate (TAIC), triallyl cyanurate (TAC), trimethylolpropane trimethacrylate (TMP), or similar compounds.

The fibrous material may be a fiberglass, an organic fiber, and similar materials. The fibrous material is used in the form of a chopped strand having a length of 5 to 20 mm and has a content of 10 to 100 parts by weight per 100 parts by weight of the metal adhesive resin. Hereinafter, the parts are by weight unless otherwise specified. The fibrous material having a length shorter than 5 mm cannot produce a foamed product which satisfies rigidity requirements. The fibrous material having a length longer than 20 mm cannot be easily mixed with another ingredients. Furthermore, the fibrous material having a content less than 10 parts cannot also produce a foamed product which satisfies rigidity requirements. The fibrous material having a content greater than 100 parts may cause difficulty of mixing and ready release of gases generated.

The foamable composition may additionally contain supplemental fillers such as calcium carbonate, talc and clay. Further, the foamable composition may contain reaction auxiliaries, as necessary.

Preferably, prior to arrangement into the cavity, the foamable composition as formulated is formed into a profiled block or piece having a desired configuration corresponding to the configuration of the cavity.

The mixing process of the ingredients for formulating the foamable composition and the forming process of the foamable composition are conducted at a low temperature sufficient to avoid activation of the foaming agent, respectively. For the mixing process and the forming process, well known techniques and machines may be selectively used. Further, the heating process of the foamable composition and the metal component can be conducted by utilizing desired heating means under atmospheric pressure (room pressure).

The foamable composition as formulated is merely an intimate blend of which the ingredients are not reacted with each other. When the foamable composition is heated, the ingredients thereof are reacted with each other. Thus, the foamable composition is expanded at an expansion ratio of 2 to 5 to form a foamed product. The fibrous material functions to increase the strength of the foamed product without decreasing the foamability of the foaming agent.

The foamed product obtained from the foamable composition containing EMA, EEA or EBA exhibits a good adhesion to a metallic surface of the cavity. The fiberglass having a length of 5 to 20 mm may effectively increase the strength of the foamed product without preventing the expandability of the foamable composition. The foamable composition formed into a profiled block can be easily arranged in the cavity.

The method of the present invention may be described in detail by the following laboratory examples:

EXAMPLE 1

To formulate a foamable composition, 100 parts of EMA, 3 parts of ADCA, 1 part of DCP, 0.2 part of ZnO, and 50 parts of fiberglass having a length of 6 mm were mixed in an oven roll. The foamable composition thus formulated was extruded to form a mat-like extrudate. Subsequently, the mat-like extrudate was press formed into a foamable sheet having a thickness of 10 mm. The press forming process was conducted at a low temperature sufficient to avoid undesirable foaming of the foamable composition. The sheet was then stamped out to form a rectangular foamable piece having a dimension of 20 mm×70 mm. The foamable piece was arranged in a cavity of a formed steel component. The steel component with the foamable piece was then placed in an oven, and was baked at 170° C. for 25 minutes under atmospheric pressure. As a result, the cavity was completely filled with the foamable composition. Further, the foamable composition in the cavity was cured into a good rigid foamed product (cured product). The resultant rigid foamed product thus formed had an expansion ratio of 4 and exhibited excellent rigidity. The rigid foamed product exhibited a hardness of 45 when determined by utilizing a K6301C. type hardness tester based on JIS (Japanese Industrial Standard). Moreover, the rigid foamed product was firmly adhered to the surface of the cavity.

EXAMPLE 2

To formulate a foamable composition, 100 parts of EMA, 2 parts of ADCA, 0.7 part of DCP, 0.2 part of ZnO, 0.1 part of stearic acid, 50 parts of calcium carbonate, and 30 parts of fiberglass having a length of 13 mm were mixed in an oven roll. The foamable composition thus formulated was extruded to form a mat-like extrudate. Subsequently, the mat-like extrudate was press formed into a foamable sheet having a thickness of 5 mm. The press forming process was conducted at a low temperature sufficient to avoid undesirable foaming of the foamable composition. The sheet was then stamped out to form a disk-like foamable piece having a diameter of 65 mm. The foamable piece was arranged in the cavity of the formed steel component. The steel component with the foamable piece was then placed In an oven, and was baked at 165° C. for 30 minutes under atmospheric pressure. As a result, the cavity was completely filled with the foamable composition. Further, the foamable composition in the cavity was cured into a good rigid foamed product (cured product). The resultant rigid foamed product thus formed had an expansion ratio of 3 and exhibited excellent rigidity. The rigid foamed product exhibited a hardness of 38 when determined by utilizing a K6301C. type hardness tester based on JIS (Japanese Industrial Standard). Moreover, the rigid foamed product strongly adhered to the surface of the cavity.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A method of rigidifying a formed, metal component, comprising the steps of:

mixing together:

a metal adhesive resin selected from the group consisting of an ethylene-methyl acrylate copolymer resin, an ethylene-ethyl acrylate copolymer resin, an ethylene-butyl acrylate copolymer resin, and a mixture containing not less than 50% by weight of said ethylene-methyl acrylate copolymer resin, ethylene-ethyl acrylate copolymer resin or ethylene-butyl acrylate copolymer resin with not more than 50% by weight low density polyethylene;

a foaming agent;

a foaming accelerator;

a crosslinking agent;

a monomer selected from the group consisting of triallyl isocyanurate, triallyl cyanurate and trimethylolpropane trimethacrylate; and a fibrous material;

to formulate a foamable composition;

arranging the foamable composition in a cavity of the formed metal component; and heating the metal component with the foamable composition to foam, cross-link and rigidify the foamable composition.

2. The method as defined in claim 1, wherein said mixing step is conducted at a low temperature sufficient to avoid activation of the foaming agent.

3. The method as defined in claim 1, wherein the fibrous material is of a fiberglass having a length of 5 to 20 mm and having a content of 10 to 100 parts by weight per 100 parts by weight of the metal adhesive resin.

4. The method as defined in claim 1, further comprising the step of forming the foamable composition into a profiled block having a desired configuration corresponding to the configuration of the cavity.

* * * * *